United States Patent
Hwang et al.

(10) Patent No.: US 12,382,337 B2
(45) Date of Patent: Aug. 5, 2025

(54) METHOD FOR MERGING AND TRANSMITTING, BY NETWORK, VRU MESSAGES IN WIRELESS COMMUNICATION SYSTEM SUPPORTING SIDELINK, AND APPARATUS THEREFOR

(71) Applicant: LG ELECTRONICS INC., Seoul (KR)

(72) Inventors: Jaeho Hwang, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 323 days.

(21) Appl. No.: 17/911,098

(22) PCT Filed: Mar. 12, 2021

(86) PCT No.: PCT/KR2021/003094
§ 371 (c)(1),
(2) Date: Sep. 12, 2022

(87) PCT Pub. No.: WO2021/182912
PCT Pub. Date: Sep. 16, 2021

(65) Prior Publication Data
US 2023/0141488 A1     May 11, 2023

(30) Foreign Application Priority Data
Mar. 13, 2020 (KR) .......................... 10-2020-0031501

(51) Int. Cl.
*H04W 28/06*     (2009.01)
*H04W 4/40*     (2018.01)
(Continued)

(52) U.S. Cl.
CPC ............. *H04W 28/06* (2013.01); *H04W 4/40* (2018.02); *H04W 72/51* (2023.01); *H04W 92/10* (2013.01)

(58) Field of Classification Search
CPC ....... H04W 28/06; H04W 4/40; H04W 72/51; H04W 92/10; H04W 4/025; H04W 92/18;
(Continued)

(56) References Cited

U.S. PATENT DOCUMENTS 11,153,721 B2 * 10/2021 Graefe ................. G08G 5/0013
11,394,510 B2 * 7/2022 Vagner .................... H04W 4/18
(Continued)

FOREIGN PATENT DOCUMENTS

KR     1020170082260     7/2017

OTHER PUBLICATIONS

PCT International Application No. PCT/KR2021/003094, Written Opinion of the International Search Report dated Jun. 25, 2021, 9 pages.

*Primary Examiner* — Brian T O Connor
(74) *Attorney, Agent, or Firm* — LEE, HONG, DEGERMAN, KANG & WAIMEY

(57) ABSTRACT

Disclosed are a method for merging and transmitting, by a network, VRU messages and an apparatus therefor. The method comprises the steps of: receiving, through an uplink, a first VRU message including information on a first VRU; and transmitting, through a downlink at a preconfigured time point, a second VRU message in which a plurality of VRU messages received from a plurality of VRUs for a preconfigured time period are merged, wherein it is determined whether to merge the first VRU message with the second VRU message according to a mobility change calculated on the basis of previous mobility information on the first VRU and mobility information obtained from the first VRU (Continued)

message, and, when the mobility change is greater than or equal to a preconfigured threshold, the first VRU message is transmitted through the downlink without merging the first VRU message with the second VRU message.

11 Claims, 23 Drawing Sheets

(51) Int. Cl.
*H04W 72/51* (2023.01)
*H04W 92/10* (2009.01)

(58) Field of Classification Search
CPC ..... H04W 4/12; H04W 28/02; H04W 28/065; H04W 28/0205; H04W 28/0226; H04W 56/001; H04W 56/0015
See application file for complete search history.

(56) References Cited

U.S. PATENT DOCUMENTS

| | | | | |
|---|---|---|---|---|
| 11,438,792 | B2* | 9/2022 | Zhou | H04W 8/04 |
| 11,910,279 | B2* | 2/2024 | Wu | H04W 4/12 |
| 11,979,801 | B2* | 5/2024 | Badic | H04W 28/22 |
| 12,010,589 | B2* | 6/2024 | Vanderveen | H04L 63/0823 |
| 12,068,820 | B2* | 8/2024 | Chae | H04B 7/0486 |
| 12,089,117 | B2* | 9/2024 | Graefe | G08G 1/0116 |
| 2015/0035685 | A1 | 2/2015 | Strickland et al. | |
| 2019/0053154 | A1 | 2/2019 | Song et al. | |
| 2019/0287395 | A1 | 9/2019 | Aoude et al. | |
| 2019/0297526 | A1 | 9/2019 | Das et al. | |
| 2022/0225154 | A1* | 7/2022 | Chen | H04W 28/0273 |
| 2023/0298468 | A1* | 9/2023 | Jha | G08G 1/164 |
| | | | | 701/117 |

* cited by examiner (a)

(b)

(a)

(b)

(a)

(b)

METHOD FOR MERGING AND TRANSMITTING, BY NETWORK, VRU MESSAGES IN WIRELESS COMMUNICATION SYSTEM SUPPORTING SIDELINK, AND APPARATUS THEREFOR

CROSS-REFERENCE TO RELATED APPLICATIONS

This application is the National Stage filing under 35 U.S.C. 371 of International Application No. PCT/KR2021/003094, filed on Mar. 12, 2021, which claims the benefit of earlier filing date and right of priority to Korean Application No. 10-2020-0031501, filed on Mar. 13, 2020, the contents of which are all incorporated by reference herein in their entirety.

TECHNICAL FIELD

The present disclosure relates to a method and apparatus for combining and transmitting VRU messages by a network in a wireless communication system for supporting sidelink, and more particularly to a method and apparatus for combining and transmitting a plurality of VRU messages received for a preset time period from a network.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method and apparatus for minimizing load of a UU interface by merging VRU messages received for a preconfigured time period into one VRU message and transmitting the one VRU message, for effectively protecting a VRU in an emergency situation by determining a VRU message to be merged to the one VRU message according to mobility information about the VRU, included in the VRU message, and for easy conversion between a PSM based on direct communication and a softV2X message based on the UU interface.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solution

According to an aspect, a method of merging and transmitting a VRU message by a network in a wireless communication system for supporting sidelink includes receiving a first VRU message including information on a first VRU through uplink, and transmitting a second VRU message obtained by merging a plurality of VRU messages received from a plurality of VRUs for a preconfigured time period through downlink at a preconfigured time point, wherein the network determines whether to merge the first VRU message to the second VRU message based on a mobility change calculated based on previous mobility information for the first VRU and mobility information acquired from the first VRU message, and the network independently transmits the first VRU message through downlink without merging with the second VRU message when the mobility change is equal to or greater than a preconfigured threshold.

The mobility change may include at least one of a movement speed change, a position change, or a travel angle change.

When information related to an emergency situation is included in the first VRU message and the mobility change is equal to or greater than the preconfigured threshold, the network may immediately transmit the received first VRU message through downlink irrespective of the preconfigured time point.

When the mobility change is less than the preconfigured threshold, the first VRU message may be merged to the second VRU message and is transmitted at the preconfigured time point.

When the mobility change is less than the preconfigured threshold, the network may merge the first VRU message to the second VRU message, and may predict a position for the first VRU at the preconfigured time point based on mobility information acquired from the first VRU message, and information on the first VRU message merged to the second VRU message may include information on the predicted position for the first VRU.

The first VRU message and the second VRU message may include a SoftV2X header field, a PSM container field, and a SoftV2X container field, and the SoftV2X header field may include common information for transmitting and receiving a VRU message related to SoftV2X based on a Uu interface, the PSM container field may include information related to a PSM based on a PC5 interface, and the SoftV2X container includes additional information that is not defined in the PSM.

The second VRU message may further include information a number of the plurality of VRU messages merged to the SoftV2X header field, and each of the PSM container field and the SoftV2X container may include a plurality of sub-fields corresponding to respective VRU messages.

The first VRU message and the second VRU message may be received based on a message configuration of a PSM that further includes the SoftV2X header field in a Regional Extension field, and the SoftV2X header field may include common information for transmitting and receiving a VRU message related to SoftV2X based on a Uu interface.

The preconfigured time point may be adjusted based on a mobility change between mobility information pre-acquired for each of the plurality of VRUs and mobility information of each of the plurality of VRUs acquired from each of the plurality of VRU messages.

According to another aspect, a network for merging and transmitting a VRU message in a wireless communication system for supporting sidelink includes a radio frequency (RF) transceiver; and a processor connected to the RF transceiver, wherein the processor controls the RF transceiver to receive a first VRU message including information on a first VRU through uplink, to transmit a second VRU message obtained by merging a plurality of VRU messages received from a plurality of VRUs for a preconfigured time period through downlink at a preconfigured time point, and the processor determines whether to merge the first VRU message to the second VRU message based on a mobility change calculated based on previous mobility information for the first VRU and mobility information acquired from the first VRU message, and independently transmits the first VRU message through downlink without merging with the second VRU message when the mobility change is equal to or greater than a preconfigured threshold.

The mobility change may include a change amount of at least one of a movement speed change, a position change, or a travel angle change.

The second VRU message may include a SoftV2X header field, a PSM container field, and a SoftV2X container field.

According to another aspect, a chip set for merging and transmitting a VRU message in a wireless communication system for supporting sidelink includes at least one processor; and at least one memory operatively connected to the at least one processor and configured to cause the at least one processor to perform an operation when being executed, wherein the operation includes receiving a first VRU message including information on a first VRU through uplink, transmitting a second VRU message obtained by merging a plurality of VRU messages received from a plurality of VRUs for a preconfigured time period through downlink at a preconfigured time point, determining whether to merge the first VRU message to the second VRU message based on a mobility change calculated based on previous mobility information for the first VRU and mobility information acquired from the first VRU message, and independently transmitting the first VRU message through downlink without merging with the second VRU message when the mobility change is equal to or greater than a preconfigured threshold.

The processor may control a driving mode of a V2X device related to the chip set based on the first VRU message.

According to another aspect, a computer-readable storage medium including at least one computer program for causing at least one processor to merge and transmit a VRU message in a wireless communication system for supporting sidelink includes at least one computer program configured to cause the at least one processor to perform an operation of merging and transmitting the VRU message; and a computer-readable storage medium configured to storage the at least one computer program therein, wherein the operation includes receiving a first VRU message including information on a first VRU through uplink, transmitting a second VRU message obtained by merging a plurality of VRU messages received from a plurality of VRUs for a preconfigured time period through downlink at a preconfigured time point, determining whether to merge the first VRU message to the second VRU message based on a mobility change calculated based on previous mobility information for the first VRU and mobility information acquired from the first VRU message, and independently transmitting the first VRU message through downlink without merging with the second VRU message when the mobility change is equal to or greater than a preconfigured threshold.

Advantageous Effects

According to various embodiments, load of a UU interface may be minimized by merging VRU messages received for a preset time period into one VRU message and transmitting the one VRU message, a VRU in an emergency situation may be effectively protected by determining a VRU message to be merged to the one VRU message according to mobility information about the VRU, included in the VRU message, and easy conversion between a PSM based on direct communication and a softV2X message based on the UU interface may be achieved.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
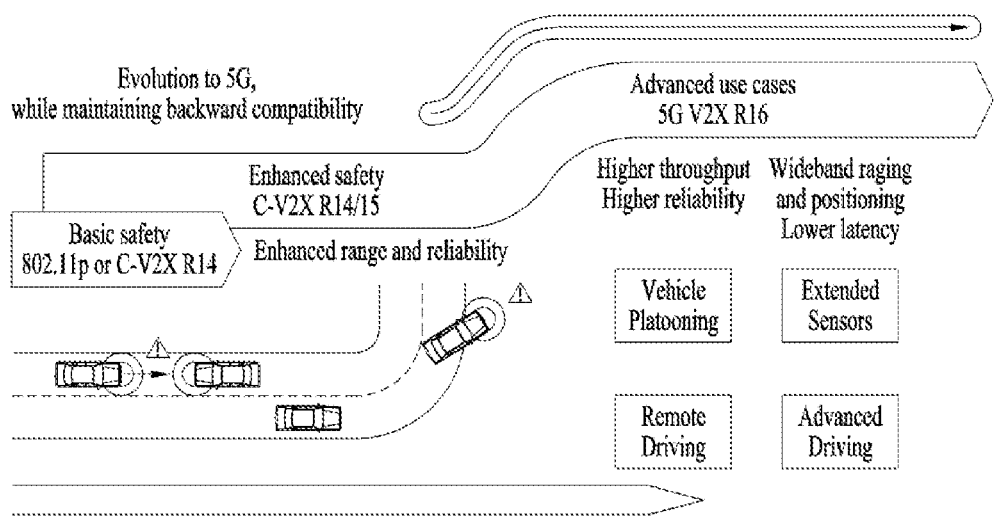
FIG. 1 is a diagram for explaining by comparing V2X communication based on RAT before NR and V2X communication based on NR.

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
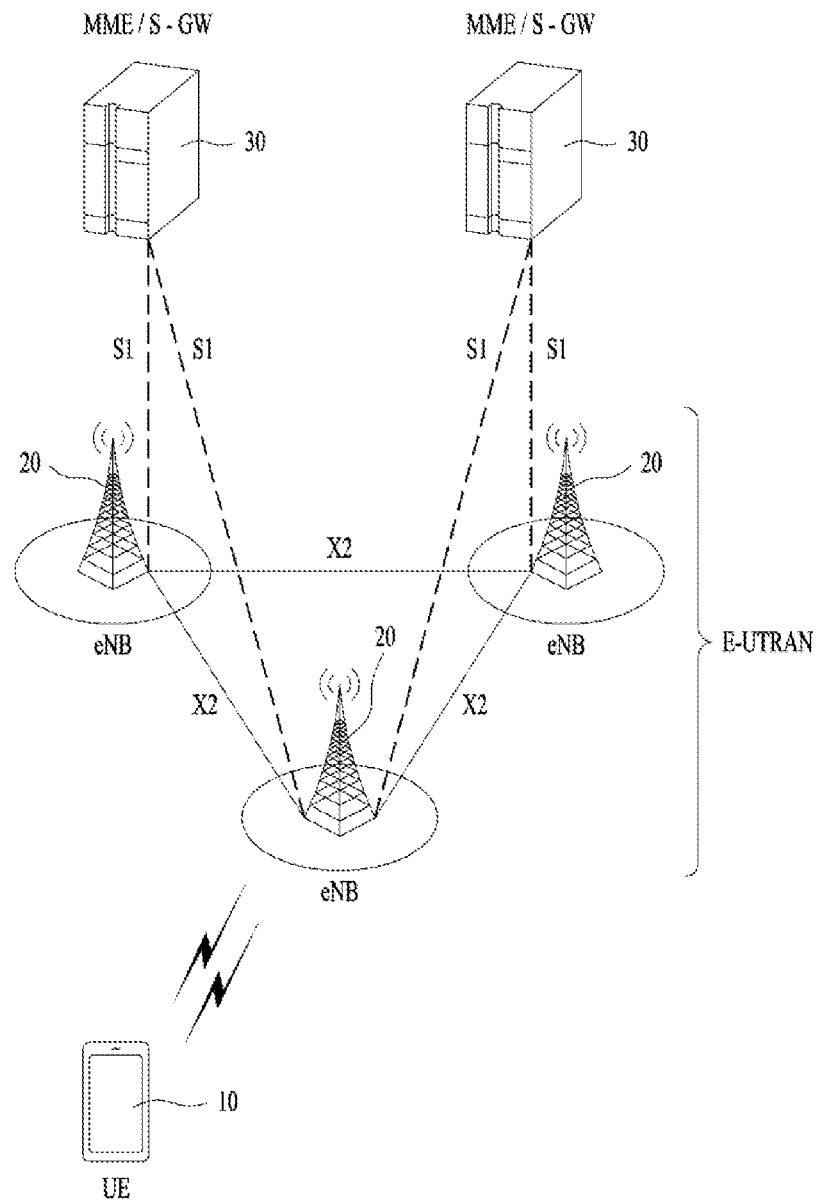
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
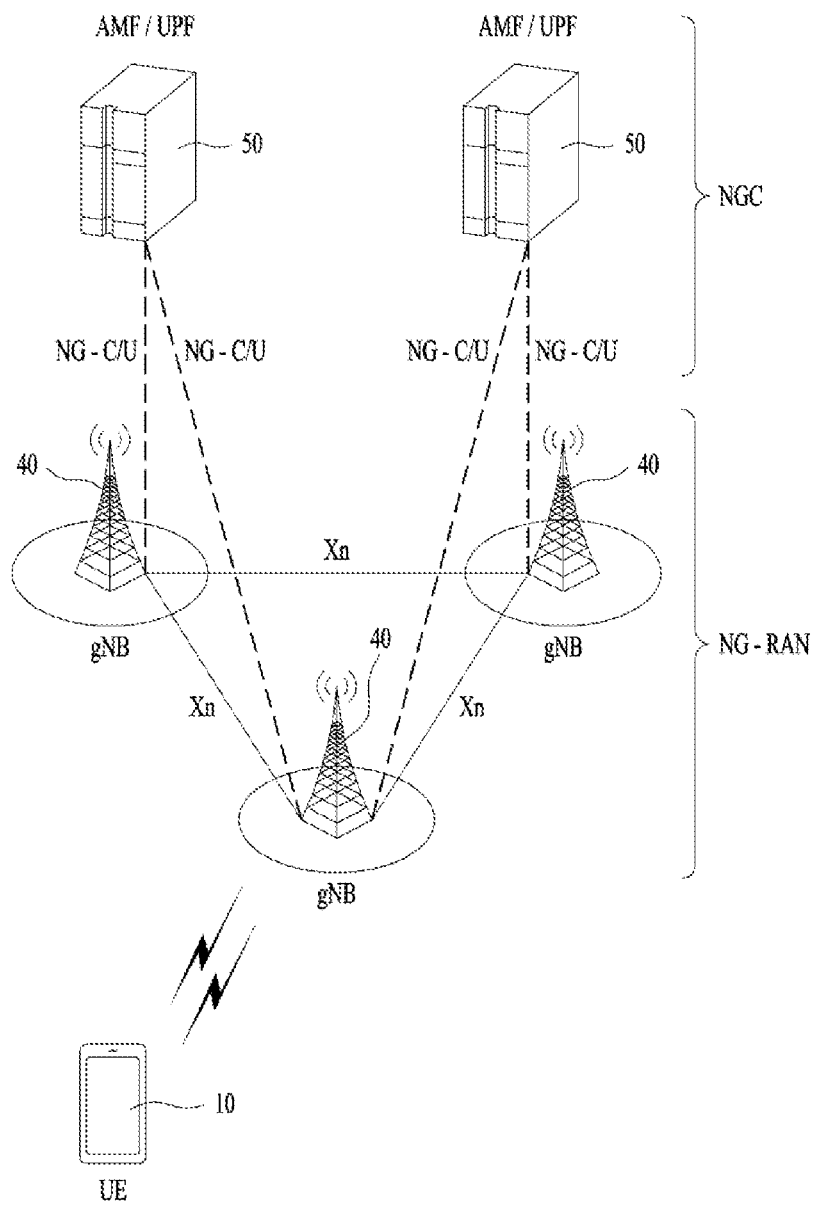
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
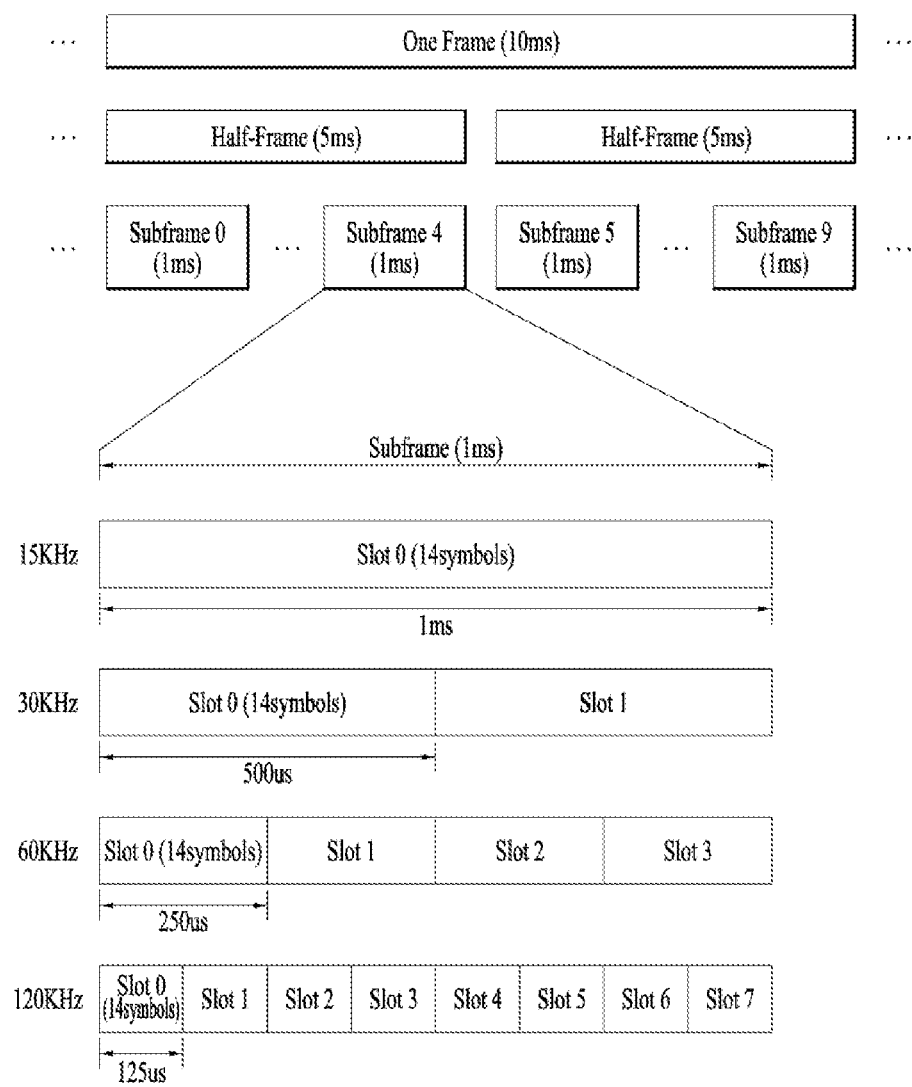
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration μ in the NCP case.

TABLE 1

| SCS (15*2u) | $N^{slot}_{symb}$ | $N^{frame,\mu}_{slot}$ | $N^{subframe,\mu}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,\mu}_{slot}$ | $N^{subframe,\mu}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz -52600 MHz | 60, 120, 240 kHz |

Figure 5:
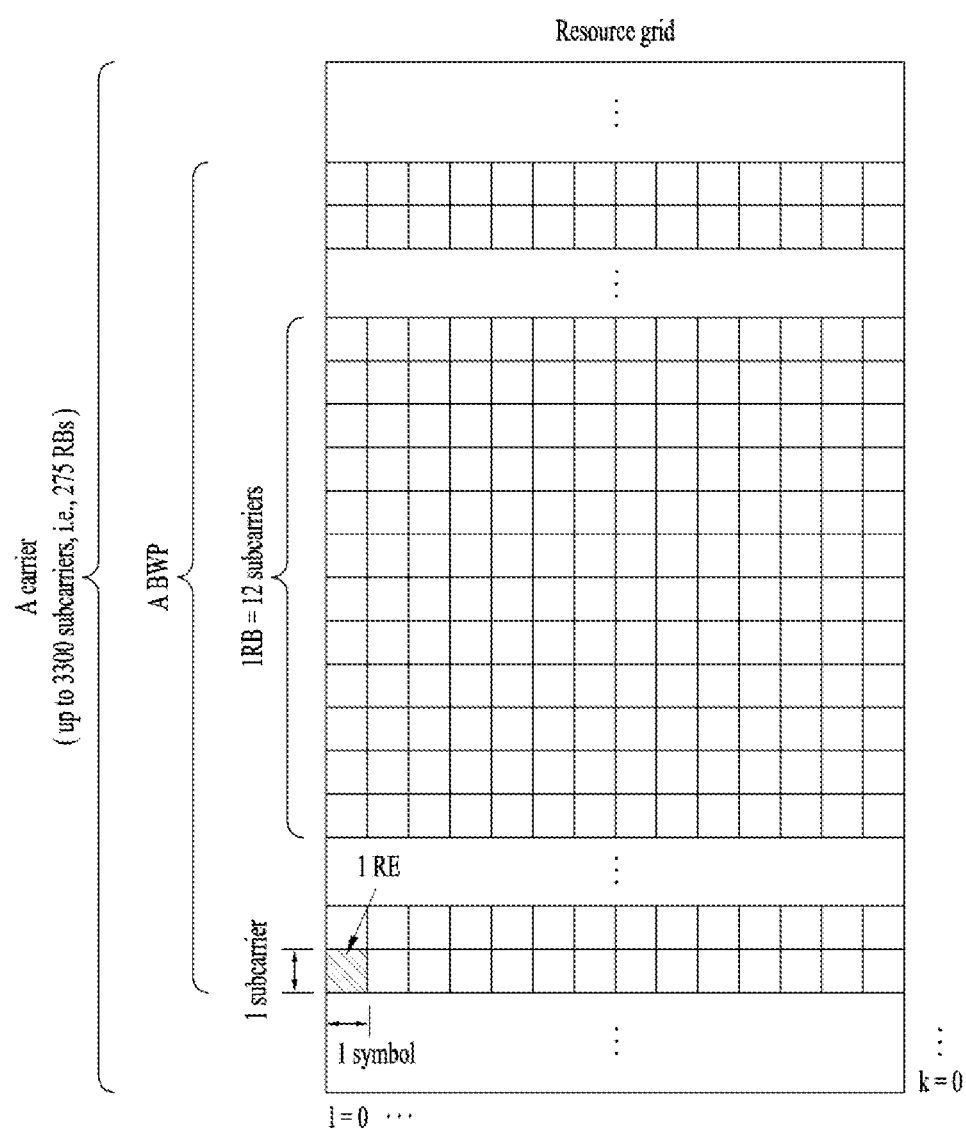
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
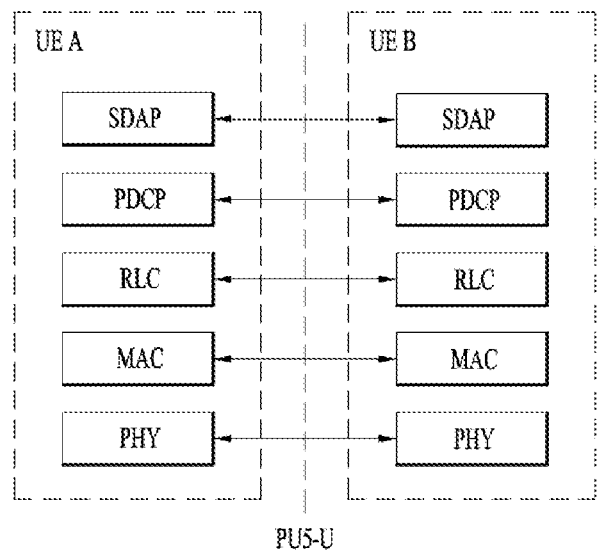
FIG. 6 illustrates a radio protocol architecture for SL communication.
Figure 6:
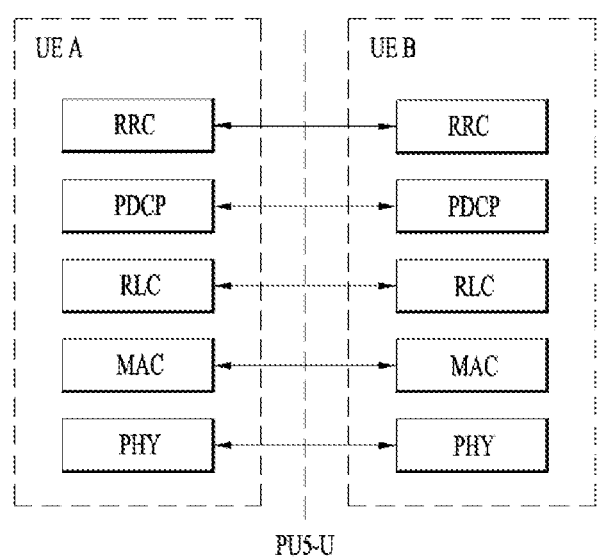

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
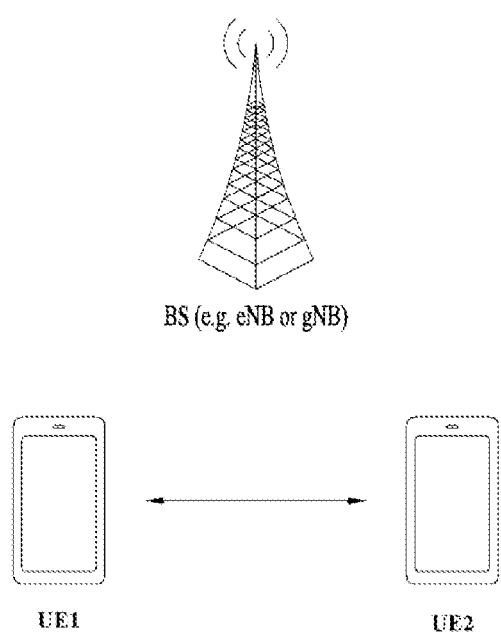
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
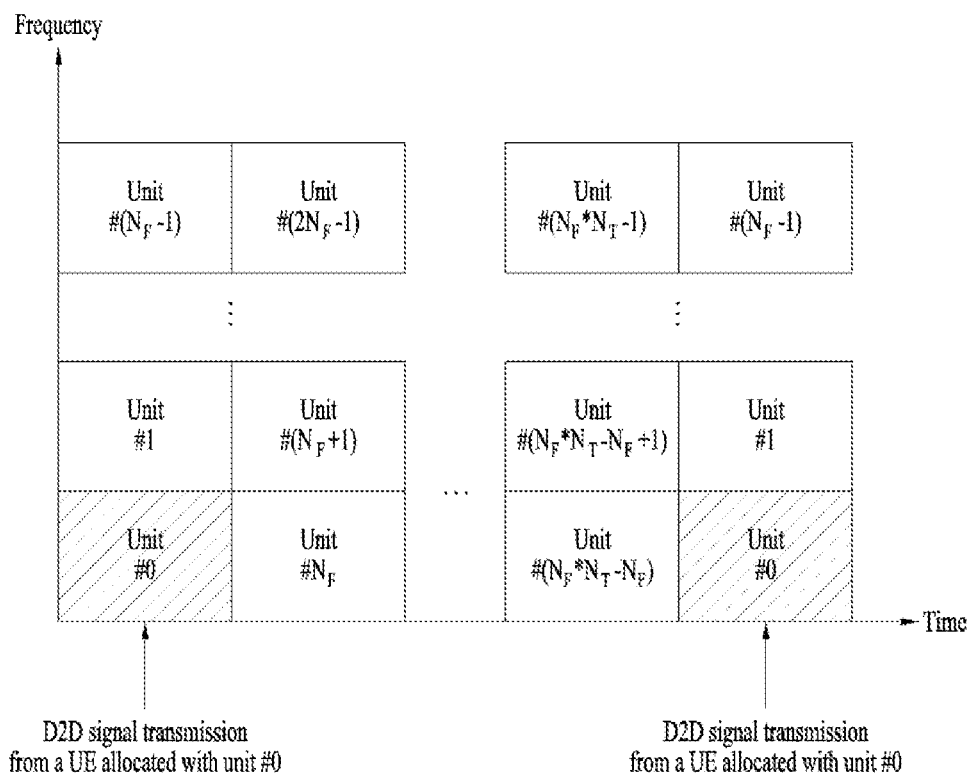
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 9:
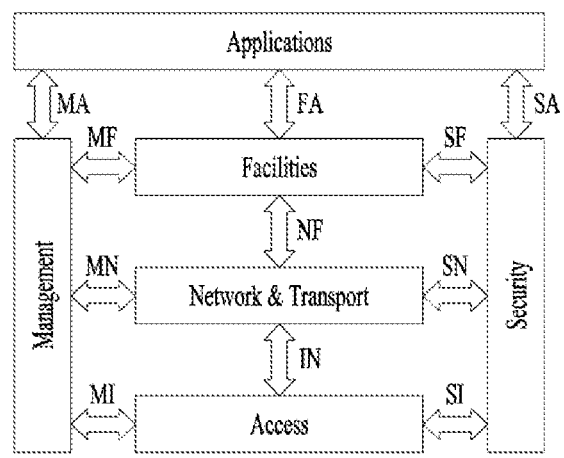
FIG. 9 is a diagram for explaining an ITS station reference architecture.

FIG. 9 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated in FIG. 9. The access layer of the ITS station corresponds to OSI layer 1

(physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

Figure 10:
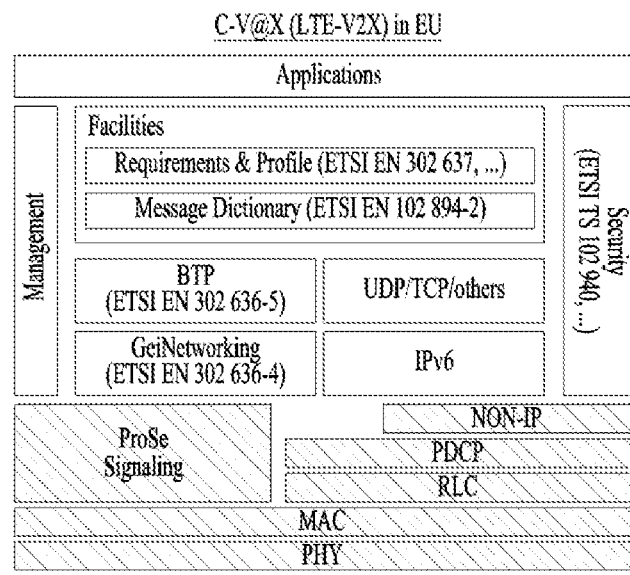
FIG. 10 illustrates an exemplary structure of an ITS station that may be designed and applied based on a reference architecture.
Figure 10:
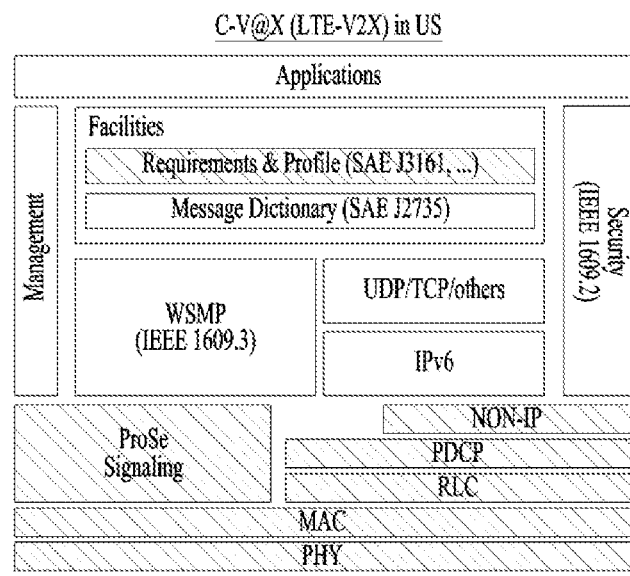

FIG. 10 illustrates an exemplary structure of an ITS station that may be designed and applied based on a reference architecture.

A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g. MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

Figure 11:
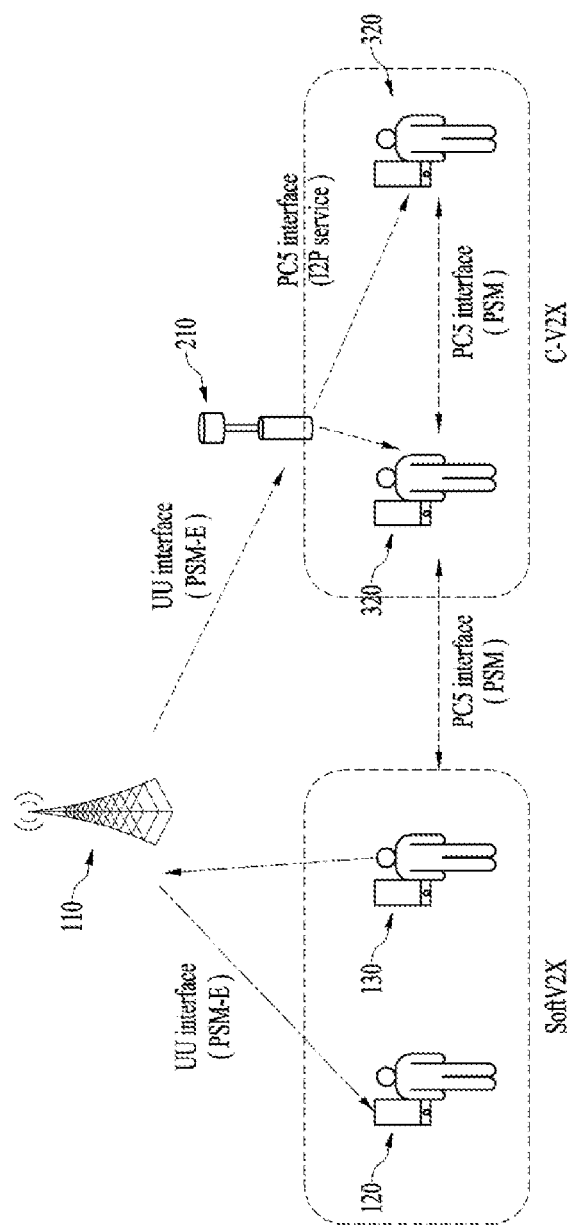
FIG. 11 is a diagram for explaining the configuration of a system of exchanging a PSM using a UU interface and direct communication.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path, and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

A SoftV2X system may be a system in which a SoftV2X server receives a VRU message or a personal safety message (PSM) from a vulnerable road user (VRU) or a V2X vehicle and transfers information on a neighbor VRU or vehicle based on the VRU message or the PSM message or may analyze a road condition, etc. on which neighbor VRUs or vehicles move and may transmit a message informing a neighbor VRU or vehicle of a collision warning, etc. based on the analyzed information (e.g., through a downlink signal) via V2X communication using a UU interface (e.g., an uplink signal). Here, the VRU message may be a message transmitted to the SoftV2X server through the UU interface, and may include mobility information about the VRU, such as a position, a movement direction, a movement path, and a speed of the VRU. That is, the SoftV2X system may use a method of receiving mobility information of VRUs and/or vehicles related to V2X communication through the UU interface and controlling a driving route or a VRU movement flow of the VRU, etc. based on the mobility information received by the softV2X server, such as a network. The SoftV2X system may be configured in relation to V2N communication.

Alternatively, the SoftV2X server may transmit and receive the PSM or VRU message based on direction communication (PC5 or DSRC) through the RSU. For example, the SoftV2X server may receive the VRU message through a UU interface (e.g., an uplink signal) from the VRU or may receive the PSM through the UU interface from the RSU that receives the PSM based on direct communication (PC5 or DSRC). In addition, the SoftV2X server may directly transmit a message related to SoftV2X to the VRU device through a downlink signal or may transmit the message related to SoftV2X to the RSU through a downlink signal, and the RSU may transmit the message related to SoftV2X based on direct communication (PC5 or DSRC).

As such, user equipment or pedestrian equipment (VRU device) that is difficult to perform direct communication (PC5 or DSRC) related to V2X communication may provide or receive driving information and mobility information to and from a neighbor vehicle or VRU through the SoftV2X system based on the UU interface. As such, the user equipment or the pedestrian equipment (VRU device) that is difficult to perform direct communication (PC5 or DSRC) may be safely protected from neighbor vehicles.

Hereinafter, a method of effectively combing VRU messages from the VRUs and transmitting the combined VRU messages to neighbor VRUs by the SoftV2X server in the SoftV2X system will be described in detail.

Configuration of Extended PSM Message Using Uu Interface

In C-V2X, the PSM may be exchanged between neighbor vehicles or VRUs in order to protect the VRU. Here, it may be difficult to continuously used the PSM in the C-V2X in that the PSM is generated based on direct communication-based (DSRC or Pc5-based) broadcast. In other words, the direct communication-based (DSRC or Pc5-based) PSM may be transmitted through broadcast, and thus a transmission rate may be lowered. Thus, In the C-V2X, in order to ensure a high transmission rate of the PSM, the PSM needs to be required through the Uu interface even in the C-V2X.

However, a method of transferring the direct communication-based (DSRC or Pc5-based) PSM through the Uu interface may not be standardized (in addition, it is not defined which method is compatible). In this regard, there may be a problem in that, in order to transmit the direct communication-based (DSRC or Pc5-based) PSM in the C-V2X through the Uu interface, the neighbor vehicle or VRU needs to extract required data from an existing message (PSM) based on direct communication and to convert the data into a message corresponding to the Uu interface based on the extracted data.

Thus, there may be a need for a configuration of a new PSM to be easily used or to be compatible based on a Uu interface and direct communication (based on DSRC or Pc5).

Hereinafter, for convenience of distinction and explanation from the PSM transmitted based on direct communication (DSRC or Pc5), the PSM transmitted through the Uu interface is defined as PSM-E and/or SoftV2X message and will be described.

FIG. 11 is a diagram for explaining the configuration of a system of exchanging a PSM using a UU interface and direct communication.

Referring to FIG. 11, a device using direct communication may use the PSM, and SoftV2X devices capable of UU interface communication may use a PSM-E message. Here, the PSM-E may be a new PSM with easy compatibility between the UU interface and direct communication.

In detail, a first device 130 capable of both the Uu interface and direct communication may directly generate the PSM-E based on the Uu interface by inserting additional information into generated PSM while generating the direct communication-based PSM in a facility layer. A second device 210 may include a SoftV2X module (i.e., based on a Uu interface), may receive the PSM-E based on the Uu interface from the SoftV2X module (or may receive the PSM-E based on the Uu interface even if the direct communication-based PSM is not received), and may provide a safety service for the VRU based on the received PSM-E.

Figure 12:
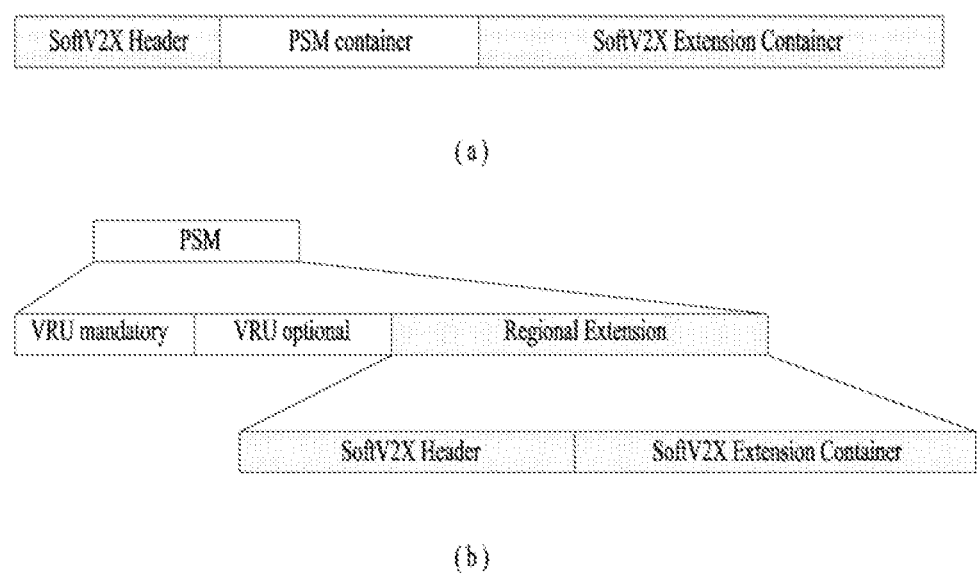
FIG. 12 is a diagram for explaining a message configuration of a PSM-E.

FIG. 12 is a diagram for explaining a message configuration of a PSM-E.

Referring to FIG. 12, the PSM-E may be generated using two methods based on the direct communication-based PSM. One generation method may be a method of encapsulating the direct communication-based PSM into a SoftV2X message type as shown in FIG. 12(a), and another generation method may be a generation method using Regional Extension (Regional Extension field) in the direct communication-based PSM as shown in FIG. 12(b).

First, the encapsulation method may be a method of generating the PSM into the message configuration to be used in the UU interface using a SoftV2X Header.

The message configuration of the PSM-E encapsulated using the SoftV2X Header may include a SoftV2X Header, a PSM container, and a SoftV2X container as shown in FIG. 12(a). The SoftV2X header may include common information for processing a SoftV2X message. The PSM container may include a PSM related to existing direct communication, and the SoftV2X container may include information that is not included in a PSM related to existing direct communication or is not defined.

The message configuration of the PSM-E may be represented according to ASN.1 and may be configured as shown in Table 5 below. The SoftV2XHeader may be defined as a DF_SoftV2XHeader, and the PSMContainer may use definition of a J2735 message that is an MSG_personalSafetyMessage such as definition of the PSM message without change in order to increase the reusability of the PSM. The SoftV2XContiainer may be defined as a DF_SoftV2XContainer.

TABLE 5

| ASN.1 Representation |
| --- |
| DF_PSMextension ::= SEQEUNCE { <br>   SoftV2XHeader DF_SoftV2XHeader <br>   PSMContainerMSG_PersonalSafetyMessage <br>   SoftV2XContainer DF_SofV2XContainer <br> } |

In detail, the DF_softV2XHeader may inform types of an encapsulated message and added data. As shown in Table 6 below, an ASN.1 configuration of the DF_softV2XHeader may include a SoftV2XType indicating types of devices of SoftV2XId and SoftV2X that are each an ID for identifying a SoftV2X device. For example, the SoftV2XType may have a value 1 (SoftV2X only) for a device using only the SoftV2X device, may have a value 2 for a device using both the SoftV2X and PC5 devices, and may have a value 3 for a device using a DSRC technology as well as SoftV2X and C-V2X.

TABLE 6

| ASN.1 Representation |
| --- |
| DF_SoftV2XHeader ::= SEQEUNCE { <br>   SofV2XId INTEGER <br>   SoftV2XType INTEGER <br>   MessageType DSRCmsgID <br>   SoftV2XContentType INTEGER <br> } |

The MessageType may indicate an encapsulated message type. For example, the MessageType may inform the encapsulated message type or message type by using DSRCmsgID without change. Lastly, the SoftV2XContentType may pre-inform a type of content to be further transmitted. For example, when a value set for the SoftV2XContentType is 0, this may mean that there is no SoftV2Xcontent, when a value set for the SoftV2XContentType is 1, this may mean that additional content related to the PSM is included, when a value set for the SoftV2XContentType is 2, this may mean that a URL address containing additional information is included, and when a value set for the SoftV2XContentType is 3, this may mean that an image clip is included.

The DF_SoftV2XContentContainer may include additional data that is not provided from the existing PSM and may include different fields according to the SoftV2XContentType. For example, when additional image information is uploaded to a server through another channel, the SoftV2XContantContainer may include additional definition for a URL as shown in Table 7.

TABLE 7

| ASN.1 Representation |
| --- |
| DF_SoftV2XContentContainer ::= SEQEUNCE { <br>   SoftV2XURL INTEGER <br> } |

Then, as shown in FIG. 12(b), the PSM-E may be generated using Regional Extension (Regional Extension field) in the direct communication-based PSM. That is, the PSM-E may be used in softV2X of the Uu interface through Regional Extension present in the existing PSM.

In detail, the existing PSM based on direct communication may include VRU mandatory, VRU optional, and the Regional Extension field created for Regional Extension. Here, the Regional Extension field may be used for SoftV2X extension (for generation of the PSM-E capable of using softV2X of the Uu interface). That is, Regional Extension may include a SoftV2X Header and/or a SoftV2X Container. In this case, when being transmitted based on direct communication (PC5 or DSRC), the PSM-E may be transmitted using the VRU mandatory and the Optional, and when being transmitted through the UU interface, the PSM-E may be transmitted using SoftV2X information according to a format of the Regional Extension.

Message Merge Configuration

Figure 13:
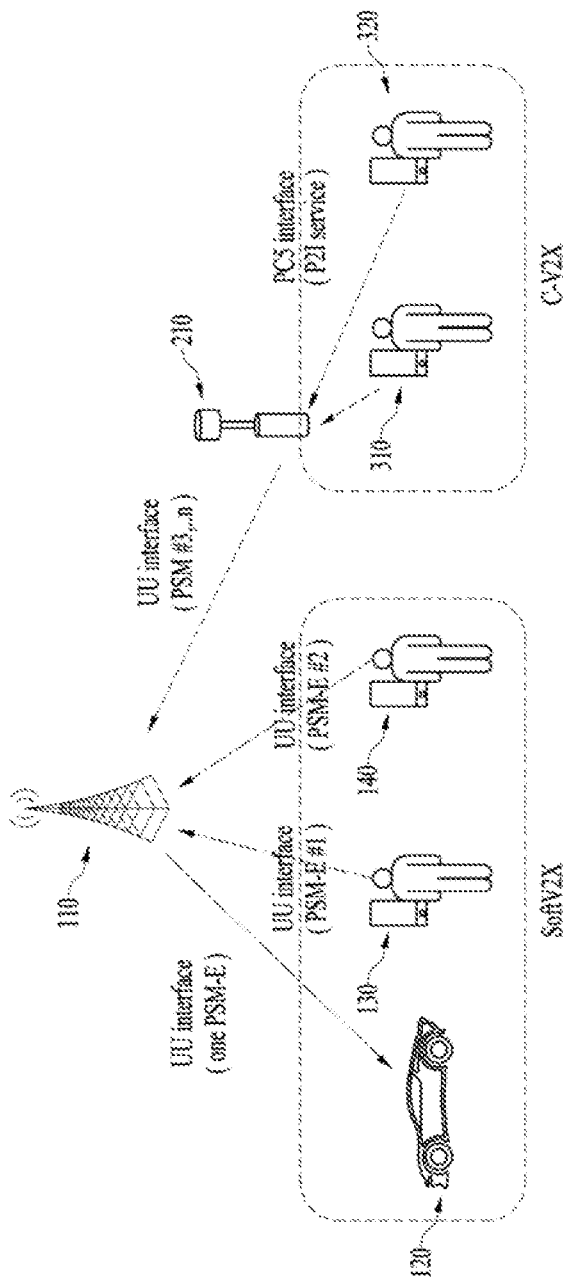
FIGS. 13 and 14 are diagrams for explaining a method of merging SoftV2X messages received from VRU devices by a SoftV2X server.
Figure 14:
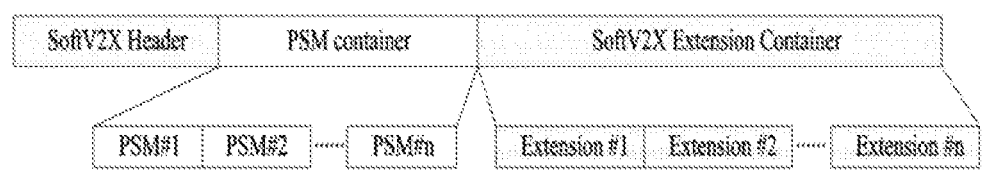
Figure 14:
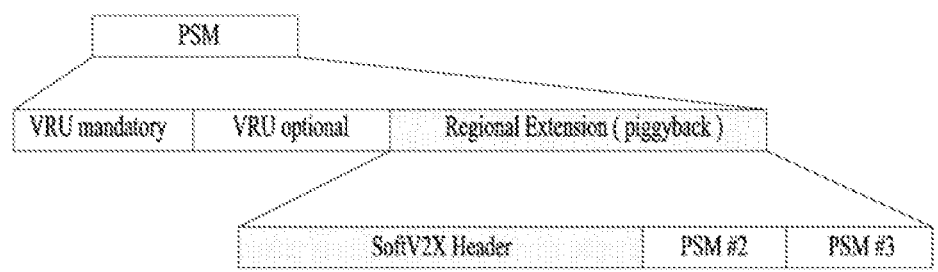

FIGS. 13 and 14 are diagrams for explaining a method of merging SoftV2X messages received from VRU devices by a SoftV2X server.

With regard to the aforementioned PSM-E, the PSM-E may be downloaded (or transmitted through downlink) as well as data-uploaded (or transmitted through an uplink signal).

In detail, the SoftV2X server may directly transfer the PSM-E (or the SoftV2X message) transmitted by the SoftV2X UE (or transmitted through an uplink signal) to a neighbor device (or neighbor VRU devices). In this case, the PSM-E may be transmitted through broadcast, unicast, and/or groupcast. However, according to the characteristics of SoftV2X, a base station (BS) and/or a SoftV2X server needs to receive a fairly large number of SoftV2X messages. Thus, when the plurality of received SoftV2X messages is transferred, the plurality of SoftV2X messages may be merged and transferred using the following proposed method.

Referring to FIG. 13, the SoftV2X server may merge or combine PSM-Es (or SoftV2X messages) received within a predetermined time interval (a preconfigured time period) and may transmit the merged or combined PSM-E signals in one SoftV2X message.

Each of a first VRU device 130 and a second VUR device 140 may upload the SoftV2X message (PSM-E #1, 2) to the BS or the SoftV2X server or may transmit the message using an uplink signal. In addition, a first RSU 210 may transmit information on the PSM (or existing PSM) received based on direct communication such as C-V2X (or the PSM-E generated based on FIG. 12) to the SoftV2X server through the UU interface. The SoftV2X server or a BS 110 related thereto may combine messages (PSM-Es or SoftV2X messages) related to the PSM received for a preconfigured time period into one message (PSM-E) and may transmit one combined message (or the merged PSM-E) to a neighbor VRU device or neighbor UEs 120.

Referring to FIG. 14(*a*), the merged PSM-E may be generated based on the encapsulation method as described above with reference to FIG. 12(*a*). Referring to Table 8, the merged PSM-E may include a SoftV2XHeader, a PSM container including information on the plurality of received PSM-Es, and a SoftV2X Extension Container including additional information related to the plurality of received PSM-Es. In other words, the collected PSM-E message may be divided into a portion for the existing PSM and a portion for the SoftV2X Extension, the divided existing PSMs may be inserted into the PSM container, and the divided SoftV2X Extension may be inserted into the SoftV2X Extension Container.

TABLE 8

| ASN.1 Representation |
| --- |
| DF_PSMextension ::= SEQEUNCE{<br>    SofV2XHeader        DF_SoftV2XHeader<br>    PSMContainerSEQUENCE (SIZE(1..100)) MSG_PersonalSafetyMessage<br>    SoftV2XContainer    SEQUENCE (SIZE(1.100)) DF_SoftV2XContainer<br>} |

Here, the SoftV2X Header for supporting the merged PSM-E may be configured as shown in Table 8. In the SoftV2X Header (the ASN.1 configuration of Table 9), the Number of message may indicate or represent the number of PSM-Es (and/or PSMs) combined with the merged PSM-E and may define MessageType and SoftV2XContentType in the number corresponding to the Number of message.

TABLE 9

| ASN.1 Representation |
| --- |
| DF_SofV2XHeader ::= SEQEUNCE {<br>    SofV2XId    INTEGER,<br>    SofV2XType INTEGER,<br>    NumberMessage    INTEGER,    OPTIONAL,<br>    MessageType SEQUENCE (SIZE(1..100)) DSRCmsgID,<br>    SoftV2XContentType SEQUENCE (SIZE(1..100)) OF INTEGER,<br>} |

Referring to FIG. 14(*b*), the merged PSM-E may be generated using the Regional Extension of the existing PSM as described above with reference to FIG. 12(*b*). In detail, the SoftV2X server may piggyback the PSM-Es (and/or PSMs) collected for the preconfigured time period to the Regional Extension of one PSM. In other words, the SoftV2X server may transmit the merged PSM-E generated by adding PSM-Es (and/or PSMs) collected for the preconfigured time period to the Regional Extension to neighboring VRU devices or UEs. In addition, the Regional Extension of the merged PSM-E may include a SoftV2X Header to use the Uu interface.

Based on the merged PSM-E generated using Regional Extension of the existing PSM, "Reg-PiggyBack" may be defined as shown in Table 10 below.

TABLE 10

| ASN.1 Representation |
| --- |
| Reg-PiggyBack ::= SEQEUNCE {<br>    PSMContainerSEQUENCE (SIZE(1..100))<br>    MSG_PersonalSafetyMessage<br>} |

Figure 15:
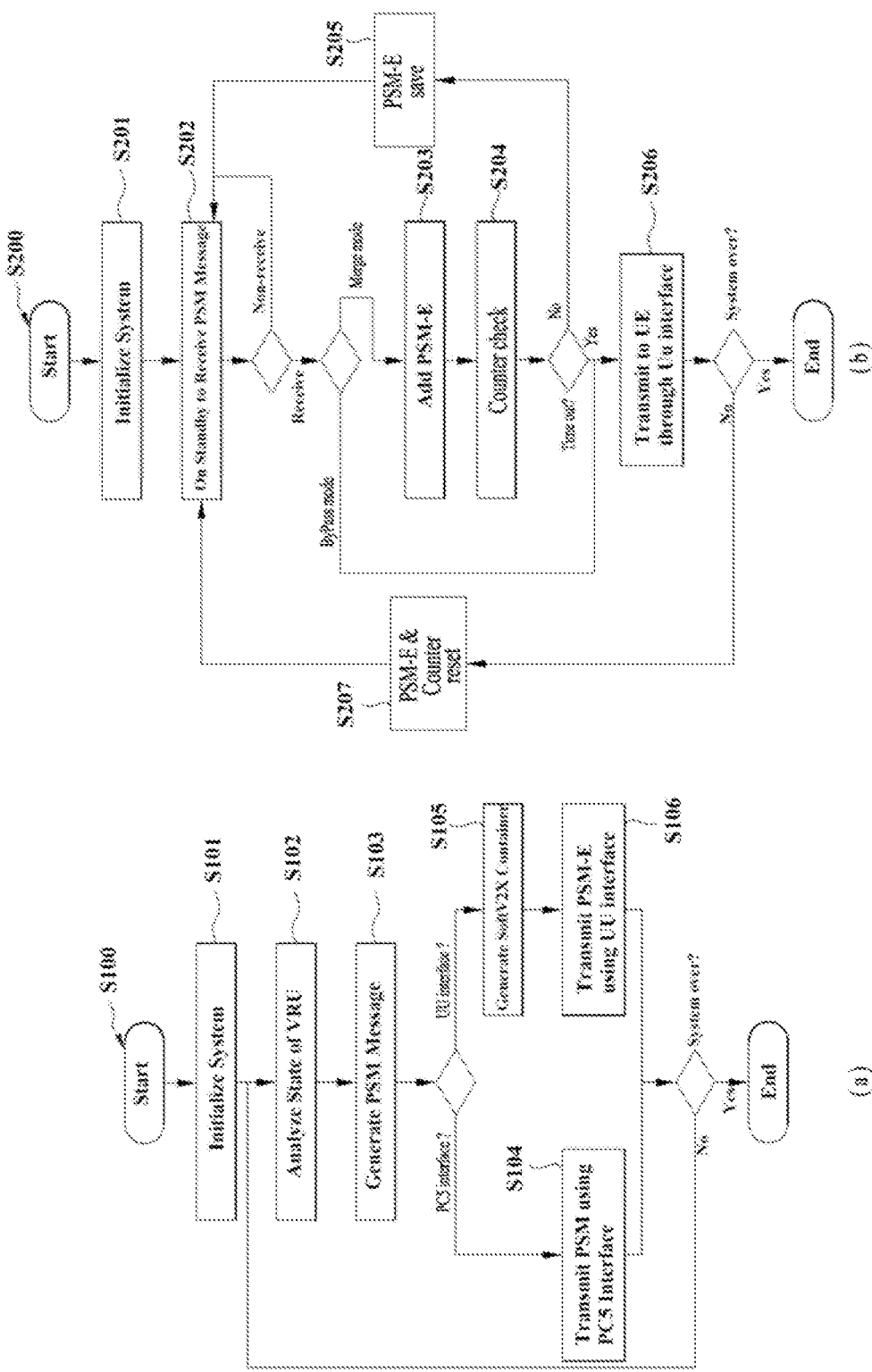
FIG. 15 is a diagram for explaining a process of transmitting a PSM-E through uplink and/or downlink.

FIG. 15 is a diagram for explaining a process of transmitting a PSM-E through uplink and/or downlink.

The aforementioned PSM-E may be generated by reusing the existing PSM, and thus the PSM-E may simplify a system for transmitting and receiving a VRU message (PSM and/or SoftV2X message) including information on a VRU through direct communication and a UU interface, and may improve the usability of the message.

Referring to FIG. 15(*a*), UE-SoftV2X devices may transmit the SoftV2X message using only the UU interface or may transmit the SoftV2X message and the PSM by using both the UU interface and direct communication (PC5 or DSRC).

In detail, the UE-SoftV2X device may initialize the system (S101) and may analyze and recognize a VRU state (S102). Then, the UE-SoftV2X device may generate the PSM through a generating algorithm for the existing PSM (S103). Here, the UE-SoftV2X device in which a device related to direct communication is present may directly transmit the generated PSM message to neighbor V2X devices (S104).

The UE-SoftV2X device capable of using the UU interface may generate a PSM-E (refer to FIG. 12) including a SoftV2X container for transmitting additional information based on the existing PSM message (S105 and S106). Then, the UE-SoftV2X device may transmit the PSM-E message to the SoftV2X server and/or a BS related thereto through the UU interface. The UE-SoftV2X device may generate the PSM-E for using the UU interface by reusing the existing PSM while generating and transmitting the existing PSM based on direct communication. In this case, the UE-SoftV2X device may easily perform signal processing between two interfaces and message generation.

Referring to FIG. 15(*b*), the SoftV2X server may receive and/or collect a plurality of PSM-Es (and/or PSMs) transmitted from the UE-SoftV2X devices for a preconfigured time period. Here, the PSM-E received from the SoftV2X server may be directly bypassed and transmitted, or may be merged with other PSM-E signals and transmitted. In other words, the SoftV2X server may directly transmit the PSM-E received in a bypass mode through the UU interface and may merge a plurality of PSM-Es received for a preconfigured time period in a merged mode into one PSM-E (or a merged PSM-E) and the merged PSM-E through the UU interface.

In detail, the SoftV2X server may initialize the system when the system starts (S201), and may receive (or on standby to receive) the PSM-E (or the PSM) from the UE-SoftV2X devices (S202). In the bypass mode, the SoftV2X server may transmit the received PSM-E to the UE-SoftV2X device (or UE) through the UU interface (S206). In contrast, in the merged mode, the SoftV2X server may add or merge at least one PSM-E received in one PSM-E (or existing PSM-E or merged PSM-E) (S203). Then, the SoftV2X server may determine whether to transmit the merged PSM-E based on a preconfigured counter (S204). Here, the preconfigured counter may be a counter that is counted over time. The SoftV2X server may store the merged PSM-E in an internal memory or the like without transmitting the merged PSM-E when the preconfigured counter is less than a specific threshold (i.e., a preconfigured period or time) (S205). The SoftV2X server may transmit the merged PSM-E in which the preconfigured counter is equal to or greater than a specific threshold (i.e., a preconfigured period or time) through the UU interface (S206). When the merged PSM-E is transmitted, the SoftV2X server may reset the preconfigured counter to generate a new merged PSM-E.

In other words, the SoftV2X server may merge PSM-Es received for a preconfigured time period to generate the merged PSM-E, and when the preconfigured time period elapses, the merged PSM-E obtained by merging the PSM-Es (or a plurality of PSM-Es received for the preconfigured time period) may be transmitted at a preconfigured time point.

Figure 16:
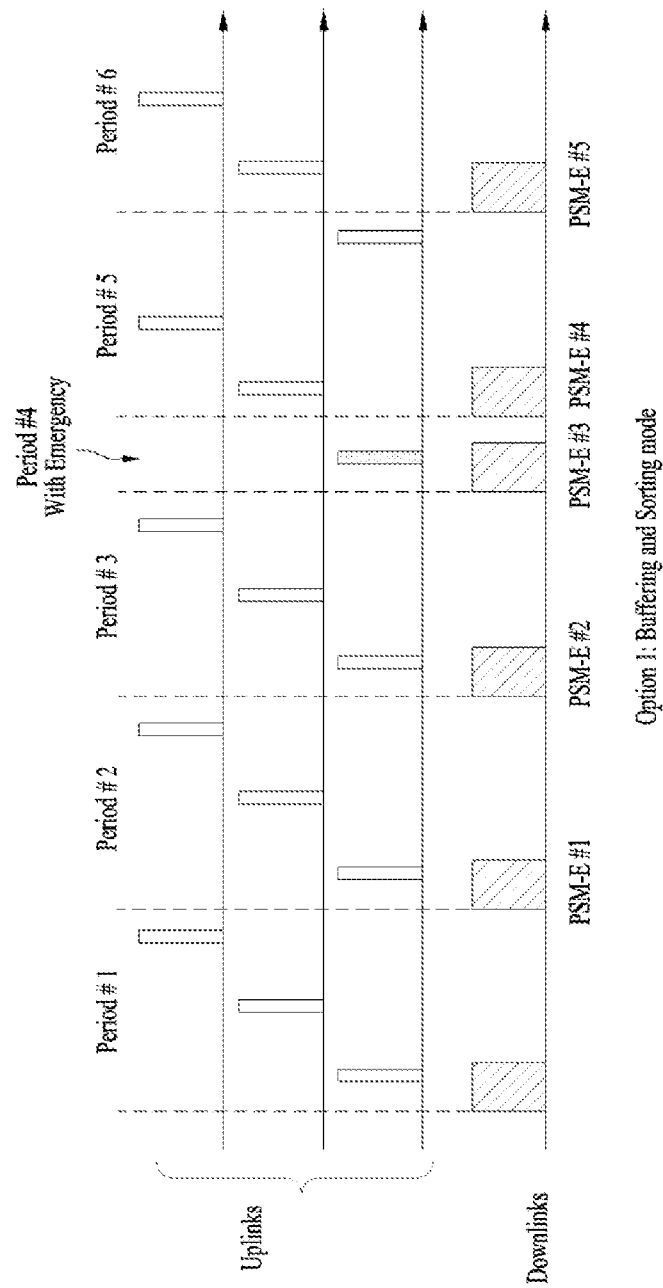
FIGS. 16 and 17 are diagrams for explaining a method of merging a plurality of PSM-Es into one merged PSM-E using a buffering method by a SoftV2X server.
Figure 17:
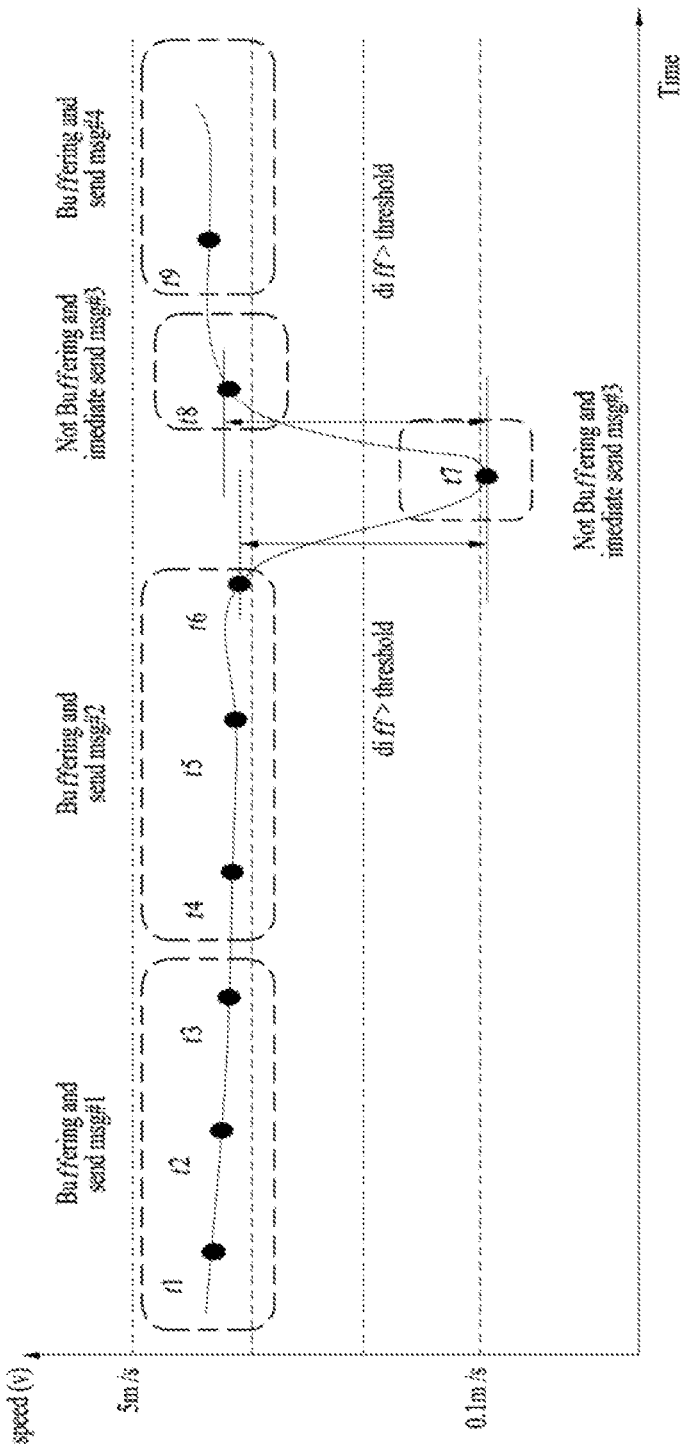

FIGS. 16 and 17 are diagrams for explaining a method of merging a plurality of PSM-Es into one merged PSM-E using a buffering method by a SoftV2X server.

The SoftV2X server may merge a plurality of PSM-Es uploaded (or received through uplink) into one merged PSM-E using a buffering method and/or an extrapolation method. Hereinafter, a method of merging a plurality of PSM-Es into one PSM-E using the buffering method.

Referring to FIG. 16, the SoftV2X server may collect at least one PSM-E for a specific time period (or a preconfigured time period) using a buffering method and may retransmit the collected PSM-Es. The SoftV2X server may set a buffering interval (or the preconfigured time period) based on a latency value allowed based on service characteristics (or service type, service priority, service latency requirement, etc.). The SoftV2X server may sort the plurality of PSM-Es received through uplink according to a reception time, and may extract at least one PSM-E to be included in the merged PSM-E. In other words, the SoftV2X server may sort the plurality of PSM-Es received through uplink according to a reception time, may extract the PSM-Es received within a preconfigured time period among the sorted plurality of PSM-Es, and may generate the merged PSM-E. Then, the SoftV2X server may transmit the merged PSM-E (or transmit the merged PSM-E through downlink) according to a transmission period thereof (or according to the preconfigured time period as a period).

As shown in FIG. 16, when receiving a specific PSM-E containing information on an emergency situation at Period #4 through uplink or receiving a specific PSM-E for detecting a sudden change in the mobility of the VRU above a specific threshold through uplink, the SoftV2X server may immediately transmit the specific PSM-E without performing the buffering operation That is, when detecting that an emergency situation occurs in a specific VRU based on the received PSM-E, the SoftV2X server may insert a separate flag and may urgently transmit the PSM-E from which the emergency situation is detected based on the flag without performing a buffering operation. In addition, when receiving the PSM-E from which a sudden change in data of a specific VRU (e.g., a change in movement speed, a change of position, and/or a change in a heading angle) is detected, the SoftV2X server may immediately transmit the PSM-E for the specific VRU through downlink (or according to the aforementioned bypass mode) without performing the buffering operation (i.e., without merging with another PSM-E)

FIG. 17 shows a speed change during T1 to T9 of any one VRU based on a PSM-E periodically received from the one VRU. That is, the SoftV2X server may detect or calculate a change in the speed of one VRU based on the PSM-E periodically received from the one VRU.

As shown in FIG. 17, the speed of the one VRU may be changed urgently or rapidly (rapid deceleration or rapid acceleration) around T7. As such, when receiving the PSM-E from which a difference in a state value equal to or greater than a threshold (e.g., a difference between a state value based on a previously received PSM-E and a state value based on a currently received PSM-E) is detected, the SoftV2X server may immediately transmit PSM-E (or through downlink) without a buffering operation.

The preconfigured time period or a period in which the buffering operation is performed may be adjusted or changed based on various input data and Equation 1 below.

$$\text{diff} = w_1 * \text{diff}_{pos} + w_2 * \text{diff}_{speed} + w_2 * \text{diff}_{angle} + \ldots \quad [\text{Equation 1}]$$

Here, $\text{diff}_{pos}$ is a position change amount, cliff is a speed change amount, $\text{diff}_{angle}$ is a heading angle change amount, and w1, w2, and w3 are weights. That is, with regard to a buffering operation, a period may be determined based on the sum of a position change amount, a speed change amount, and/or a heading angle change amount, to which a weight is applied. In addition, $\text{diff}_{pos}$ is the sum of position change amounts related to VRU messages to be merged, $\text{diff}_{speed}$ the sum of speed change amounts related to VRU messages to be merged, and $\text{diff}_{angle}$ is the sum of heading angle change amounts related to VRU messages to is be merged.

Then, the preconfigured time period or a period in which the buffering operation is performed may be determine or adjusted according to a buffering level corresponding to the sum of final differences (or finally calculated diff value) as shown in Equation 2 below. For example, when the diff value is equal to or greater than a first threshold, the buffering level may be set to 1, and the received PSM-E may be immediately transmitted through downlink without buffering. Alternatively, the period or the preconfigured time period may be adjusted to 0.

$$\text{Buffering Level} = \begin{cases} 1, & \text{if } \textit{diff} > \textit{treshold}_1 \\ 2, & \textit{alse if } \textit{diff} > \textit{treshold}_2 \\ \vdots & \vdots \\ n, & \textit{alse if } \textit{diff} > \textit{treshold}_n \end{cases} \quad [\text{Equation 2}]$$

Figure 18:
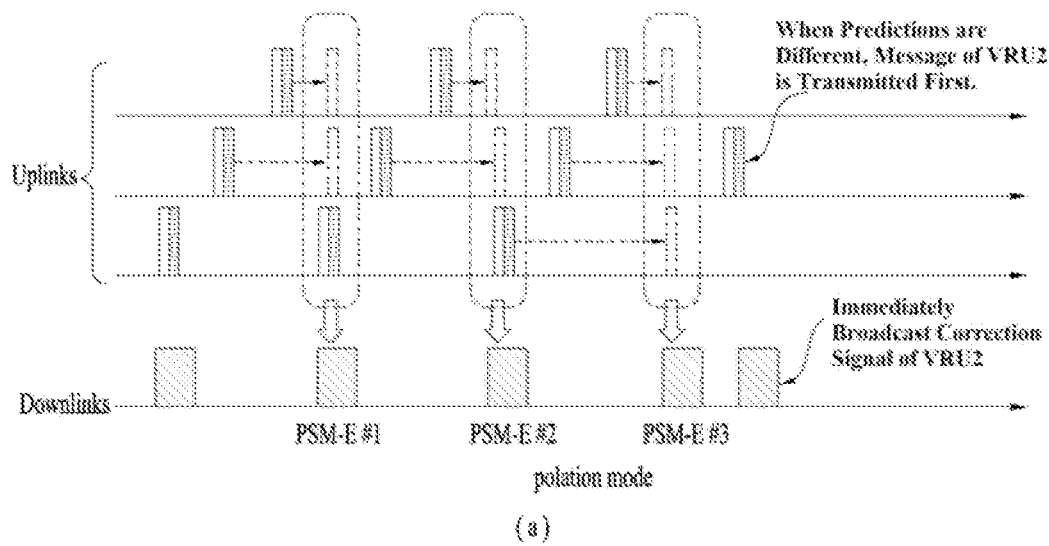
FIG. 18 is a diagram for explaining a method of merging a plurality of PSM-Es into one merged PSM-E using an extrapolation method by a SoftV2X server.
Figure 18:
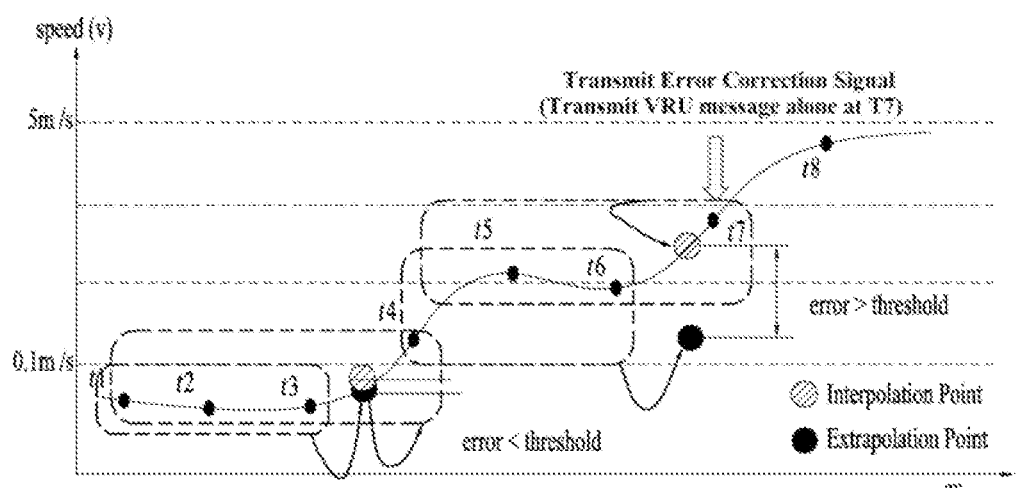

FIG. 18 is a diagram for explaining a method of merging a plurality of PSM-Es into one merged PSM-E using an extrapolation method by a SoftV2X server.

Referring to FIG. 18(a), the SoftV2X server may estimate or predict a position of the VRU device at a preconfigured time point, which is a transmission time at which the merged PSM-E is to be transmitted, based on the PSM-E received within the preconfigured time period.

In detail, according to the extrapolation method, when transmitting a plurality of PSM-Es collected for a preconfigured time period into the merged PSM-E, the SoftV2X server may not transmit past information of the VRUs included in the buffered PSM-E. The SoftV2X server may extrapolate the position of the VRU at a transmission time based on the past information of the VRU included in the buffered PSM-E (i.e., may predict a position value at the transmission time based on the position value, the speed value, and the temporary speed values included in the past information), may merge PSM-Es including a predicted value according to extrapolation into one PSM-E, and may transmit the merged PSM-E. In this case, receiving terminals may directly use the position values of the VRUs included in the merged PSM-E without a separate additional predict process.

In other words, the SoftV2X server may estimate the predicted position, which is the position of the VRU device that transmits the PSM-E at the transmission time, based on the VRU information (acceleration, speed, and position for the VRU) included in the PSM-E, and may correct the VRU information to include the predicted position. In this case, the SoftV2X server may generate the merged PSM-E by merging PSM-Es including the corrected VRU information, and may transmit the merged PSM-E to a neighbor VRU or V2X device through downlink.

However, the predicted value may have an error with an actual position of each of the VRUs at the transmission time. In order to minimize the error, the SoftV2X server may not merge the first PSM-E into the merged PSM-E when the error is equal to or greater than a specific threshold error based on the received first PSM-E, and may immediately transmit the first PSM-E through downlink.

In detail, referring to FIG. 18(b), the Soft V2X server may receive the first PSM-E from a second VRU device (VRU2) and may then receive the second PSM-E. In this case, the Soft V2X server may predict a first position of the second VRU device at a transmission time of a first merged PSM-E related to the first PSM-E based on the first PSM-E. When a difference between the predicted first position and a second position of the second VRU device included in the second PSM-E is equal to or greater than the specific threshold error, the Soft V2X server may independently and immediately transmit the second PSM-E irrespective of a period of the merged PSM-E in order to correct the error of the VRU. In this case, a safety problem of the second VRU device due to the error may be minimized. Here, the specific threshold error may be determined based on a reception period of the PSM-E transmitted from the second VRU device or may be preconfigured. That is, the specific threshold error may be determined based on a difference between the predicted positions based on a reception time difference between the first PSM-E and the second PSM-E.

Alternatively, the Soft V2X server may predict a $(1-1)^{th}$ position that is a position of the second VRU device at a reception time of the second PSM-E based on VRU information included in the first PSM, and may determine whether a difference between the predicted (1-position and the second position is equal to or greater than the specific threshold error. When the difference between the $(1-1)^{th}$ position and the second position is equal to or greater than the specific threshold error, the Soft V2X server may independently and immediately transmit the second PSM-E irrespective of a period of the merged PSM-E.

Referring to FIG. 18(b), the position prediction using the extrapolation method may be performed based on three PSM-Es that are previously received any one VRU device. The SoftV2X may predict the speed and/or position of the one VRU device at a transmission time of the merged PSM-E based on the three or more PSM-Es from the one VRU device. Here, the accuracy of prediction of the position or speed of the VRU device at the transmission time may be increased as the number of the previous PSM-Es related to the VRU device is increased.

As such, the SoftV2X device may predict the speed and/or position of the VRU device at the transmission time of the merged PSM based on the past speed values related to the VRU device, may correct the VRU device to include the predicted speed and/or position, and may merge the PSM-E including the corrected VRU information to the merged PSM-E. Then, when receiving a new PSM-E from the VRU device, the SoftV2X device may compare the predicted speed and/or position with the speed and position of the VRU device included in the new PSM-E to verify whether the predicted speed and/or position is an accurate value.

For example, as shown in FIG. 18(b), the SoftV2X device may determine whether a difference between the predicted position of the second VRU, predicted through the PSM-E received at T6, and the position of the second VRU based on the PSM-E received at T7 is equal to or greater than a specific threshold error. When the difference is equal to or greater than the specific threshold error, the SoftV2X device may immediately transmit or retransmit the PSM-E received at T7 through downlink without merging. As such, the SoftV2X device may minimize a problem in terms of periodic transmission of the merged PSM-E.

As described above, when a message about a VRU is transmitted using an independent method for the Uu interface, it may be disadvantageous that another device (a device capable of only direct communication) is not capable of receiving a message about the VRU. There may be a problem in that a device capable of both of direct communication and Uu interface communication requires an additional operation of regenerating or converting the message about the VRU into the PSM according to a standard PSM format.

In consideration with the problem, a method of configuring and generating a PSM-E message for softV2X is proposed. That is, when the aforementioned PSM-E is used, the PSM may be easily generated from the VRU message in that the VRU message based on the Uu interface includes information on the PSM based on direct communication without change. Additional information of the VRU may be advantageously provided to softV2X devices through the UU interface high channel capacity.

Figure 19:
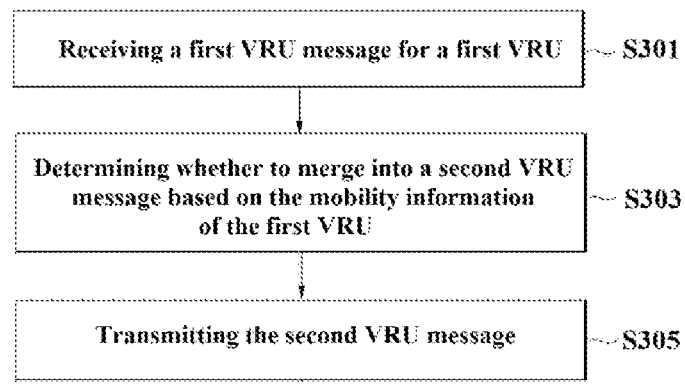
FIG. 19 is a flowchart for explaining a method of merging and transmitting VRU messages by a network in a wireless communication system.

FIG. 19 is a flowchart for explaining a method of merging and transmitting VRU messages by a network in a wireless communication system.

Referring to FIG. 19, a network (or a SoftV2X server) may receive a first VRU message including information on a first VRU through uplink (or a UU interface) (S301). The network may receive a plurality of VRU messages from a plurality of VRUs for a preconfigured time period. Here, the first VRU message and the plurality of VRU messages may be SoftV2X messages or PSM-E messages transmitted through the UU interface or through uplink.

Here, the network may merge a plurality of VRU messages received from VRUs for a preconfigured time period into a second VRU message that is one VRU message and may transmit the second VRU message. In detail, the network may collect and merge VRU messages for the preconfigured time period and may transmit a second message obtained by merging the plurality of collected VRU messages at a preconfigured time point after the preconfigured time period elapses.

In other words, transmission of the received VRU messages through downlink to the preconfigured time point may be delayed, and the received VRU messages may be transferred as the merged second VRU message through downlink when the present time is reached. That is, the network may not relay and transmit each of the plurality of VRU messages through downlink, but may merge the plurality of VRU messages into one VRU message and may transmit the one VRU message to a neighbor VRU or neighbor vehicles (or via the RSU) through downlink.

However, when the current situation is an emergency situation or there is a specific VRU message from which the VRU is determined to be protected, the network may not delay transmission of the specific VRU message up to the preconfigured time point and may immediately transmission the specific VRU message as a separate message to the neighbor VRUs or neighbor vehicles through downlink. When a mobility change amount or mobility change (e.g., a speed change, a position change, or a travel angle change) calculated based on mobility information according to the specific VRU message and mobility information according to a previously received VRU message is equal to or greater than a preconfigured threshold, the specific VRU message may be transmitted alone.

In detail, the network may determine whether the first VRU message is merged to the second VRU message based on a difference between previous mobility information about the first VRU and mobility information acquired from the first VRU message (or a mobility change amount based on the previous mobility information and the current mobility information) (S303). Here, the previous mobility information about the first VRU may be mobility information about the first VRU that is acquired from the message about the first VRU, which is previously received before the first VRU message is received.

The network may periodically receive the first VRU message and may compare current VRU mobility information according to a currently received first VRU message with previous VRU mobility information according to at least one previously received first VRU message. When a position, speed, and/or heading direction (or a travel direction) according to the previous VRU mobility information differs from a position, a speed and/or a travel direction according to the current VRU mobility information by a preconfigured threshold or more, the network may not merge the first VRU message into the second VRU message and may immediately transmit the second VRU message as a separate message up to the preconfigured time point without delay. That is, when a difference between the current VRU mobility information and the previous mobility information is equal to or greater than a preconfigured threshold, the network may not merge the first VRU message to other VRU messages and may not transmit the merged message as the second VRU message and may immediately transmit the first VRU message as the separate message through downlink.

Alternatively, when information from which an emergency situation is to be predicted or detected is included in the first VRU message (an emergency situation may also be predicted and detected when the mobility change is equal to or greater than a preconfigured threshold), the network may immediately transmit the first VRU message through downlink rather than being merged to the second VRU message. Alternatively, when information from which an emergency situation is to be predicted or detected is included in the first VRU message and the mobility difference is equal to or greater than a preconfigured threshold, the network may immediately transmit the first VRU message through downlink rather than being merged to the second VRU message. For example, even if the mobility change is detected by a preconfigured threshold or greater, when information from which an emergency situation is to be predicted or detected is not included in the first VRU message, the network may not immediately transmit the first VRU message, may merge the first VRU message to the second VRU message, and may transmit the merged message. In this case, the mobility information about the first VRU, included in the first VRU message, may be included in the second VRU message and may be transmitted at the preconfigured time point.

For example, the network may sequentially receive a $(1\text{-}2)^{th}$ VRU message after receiving a $(1\text{-}1)^{th}$ VRU message from the first VRU that is a specific VRU and may compare current mobility information of the first VRU according to the $(1\text{-}2)^{th}$ VRU message with previous mobility information of the first VRU according to the $(1\text{-}1)^{th}$ VRU message. When a difference between a speed of the current mobility information of the first VRU and a speed of the previous mobility information of the first VRU is equal to or greater than a preconfigured threshold, the network may not merge the $(1\text{-}2)^{th}$ VRU message to the second VRU message and may independently and immediately transmit the $(1\text{-}2)^{th}$ VRU message. That is, the $(1\text{-}2)^{th}$ VRU message may be immediately transmitted through downlink without being merged to the second VRU message according to a bypass mode of the network.

Then, the network may transmit the second VRU message obtained by merging the plurality of VRU messages at the preconfigured time point (S305). The preconfigured time point may be a time point at which the preconfigured time period ends (i.e., a time at which a collection time of the plurality of VRU messages ends).

In this case, as described above, when a mobility change amount or mobility change calculated based on mobility information related to the first VRU message and mobility information according to a VRU message received before the first VRU message is received is equal to or greater than a preconfigured threshold, the network may immediately transmit the first VRU message independently from the second VRU message through downlink without merging with the second VRU message (or without delay up to the preconfigured time point). Alternatively, mobility information about the first VRU, included in the first VRU message, may not be included in the second VRU message and may be included in a separate VRU message and may be immediately transmitted irrespective of the preconfigured time point. In contrast, when the mobility change (or a difference in mobility information) is less than a preconfigured threshold, the network may provide information about the first VRU by merging the first VRU message to the second VRU message obtained by merging the plurality of VRU messages and transmitting the second VRU message.

The mobility information about the first VRU included in the second VRU message may be changed to mobility information predicted at the preconfigured time point. For example, the network may predict a change in the position of the first VRU that is acquired from the first VRU message, based on information on the speed and the heading angle for the first VRU, which is acquired from the first VRU message. That is, the network may predict how the position of the first VRU is changed at the preconfigured time point based on the speed and heading angle for the first VRU, and may include the predicted position of the first VRU in the second VRU message as mobility information for the first VRU.

As shown in FIGS. 12 to 14, each of the first VRU message and the second VRU message may be a message in a PSM-E format. That is, each of the first VRU message and the second VRU message may include a SoftV2X header field, a PSM container field, and a SoftV2X container field. Here, the SoftV2X header field may include common information for transmitting and receiving a VRU message related to SoftV2X based on a UU interface, the PSM container field may include information related to a PSM based on a PC5 interface, and the SoftV2X container may include additional information that is not defined in the PSM. Each of the first VRU message and the second VRU message may be a message in the form of a SoftV2X header further included in the Regional Extension field in the existing PSM structure related to direct communication.

Furthermore, the second VRU message may further include information on the number of the plurality of VRU messages merged to the SoftV2X header field, and each of the PSM container field and the SoftV2X container may include a plurality of sub-fields corresponding to the respective VRU messages. In detail, the PSM container field may include a plurality of PSM sub-fields, and each of the plurality of PSM sub-fields may include data corresponding to each of the PSMs of the plurality of merged VRU messages. The SoftV2X container may include a plurality of SoftV2X sub-fields, and each of the plurality of SoftV2X sub-fields may include additional data for SoftV2X of each of the plurality of merged VRU messages.

The preconfigured time point at which the second VRU message is transmitted may be adjusted based on a mobility changed according to previous mobility information and current mobility information about each of the plurality of VRUs, which are received for the preconfigured time period (or a difference between the previous mobility information and the current mobility information).

In detail, referring to Equations 1 and 2, the network may calculate a position difference, a speed difference, and a heading angle difference between the previous mobility information and the current mobility information corresponding to each VRU message, may apply a first weight to the position difference for each VRU message, may apply a second weight to the speed difference, and may apply a third weight to the heading angle difference. The network may calculate the sum of the position difference, speed difference, and heading angle difference to which the weight is applied, may determine a corresponding buffering level based on the sum, and may determine a corresponding buffering level corresponding to the sum as the preconfigured time period.

The network may calculate a position difference, a speed difference, and a heading angle difference based on corresponding current mobility information and previous mobility information for each VRU (or VRU message), may calculate the sum of position differences, the sum of speed differences, and the sum of heading angle differences for each of the plurality of VRUs, may apply a first weight to the sum of the position differences, may apply a second weight to the sum of the speed differences, may apply a third weight to the sum of the heading angle differences, and may determine the preconfigured time period based on a final difference sum obtained by summing the sum of the position differences, the sum of the speed differences, and the sum of heading angle differences, to which the weight is applied. A preconfigured time period corresponding to the final difference sum may be preconfigured. For example, as the final difference sum is increased, the preconfigured time period may be preconfigured as a reduced value.

For example, a position difference, a speed difference, and a heading angle difference for the first VRU may be calculated as a first position difference, a first speed difference, and a first heading angle difference, a position difference, a speed difference, and a heading angle difference for the second VRU may be calculated as a second position difference, a second speed difference, and a second heading angle difference, and a position difference, a speed difference, and a heading angle difference for the third VRU may be calculated as a third position difference, a third speed difference, and a third heading angle difference. In this case, the network may calculate the final difference sum by applying a first weight to a first sum of the first position difference, the second position difference, and the third position difference, applying a second weight to the second sum of the first speed difference, the second speed difference, and the third speed difference, and applying a third sum to a third sum of the first heading angle difference, the second heading angle difference, and the third heading angle difference.

As such, the network may appropriately adjust the preconfigured time period or a period at which the second VRU message is periodically transmitted based on a change amount of entire mobility acquired based on VRU messages transmitted from neighbor VRUs and may more rapidly transmit the second VRU message including information on a plurality of VRUs in a situation with a large change in mobility.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 20:
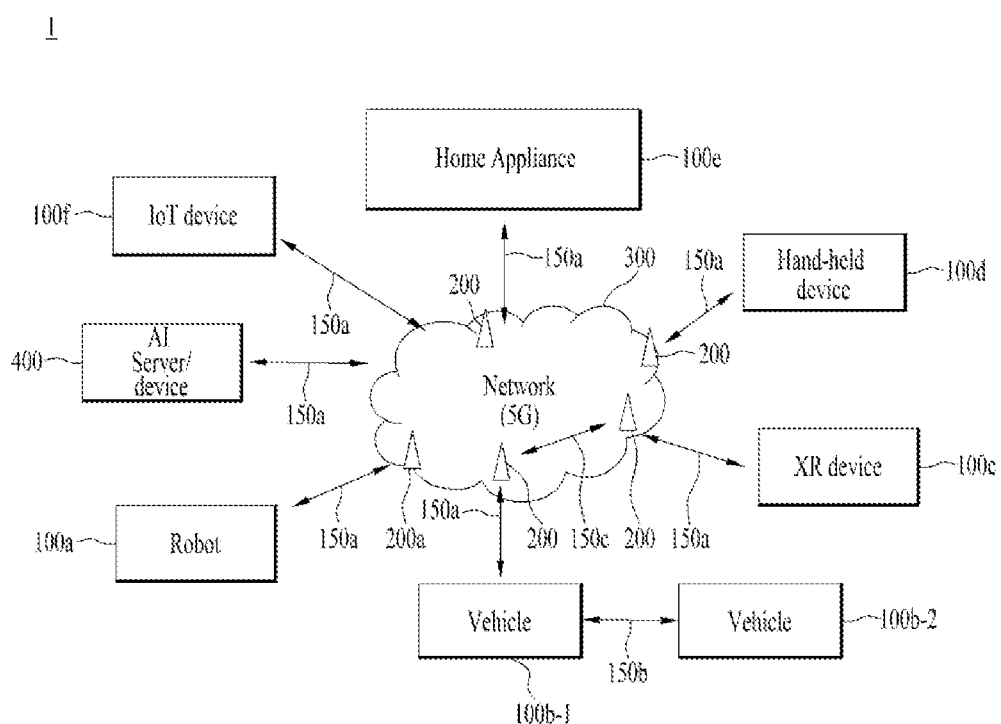
FIG. 20 illustrates a communication system applied to the present disclosure.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 21:
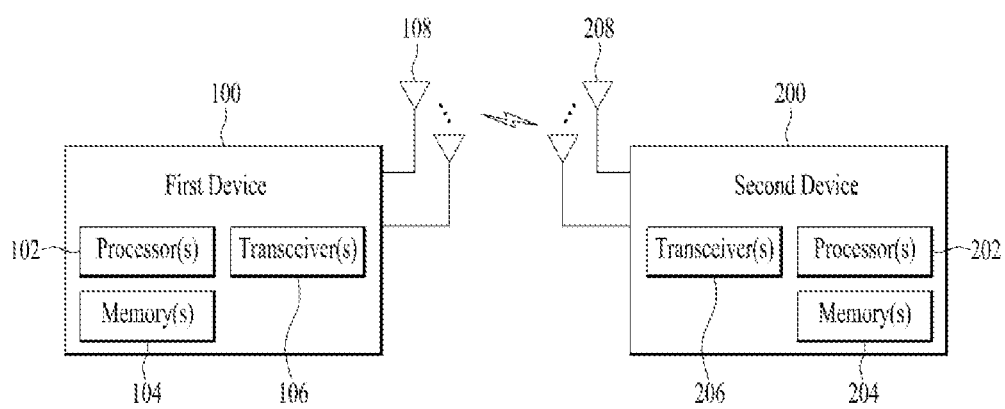
FIG. 21 illustrates wireless devices applicable to the present disclosure.

FIG. 21 illustrates a wireless device applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the UE may include the processor 102 and the memory 104 that are connected to the RF transceiver. The memory 104 may include at least one program for performing operations related to the embodiments described with reference to FIGS. 11 to 18.

The processor 102 may control the RF transceiver to receive the first VRU message including information on the first VRU through uplink, to transmit the second VRU message obtained by merging a plurality of VRU messages received from a plurality of VRUs up to the preconfigured time point through downlink at the preconfigured time point, to determine whether to merge the first VRU message to the second VRU message based on a mobility change calculated based on the previous mobility information for the first VRU and mobility information acquired from the first VRU message, and to independently transmit the first VRU message through downlink without merging with the second VRU message when the mobility change is equal to or greater than a preconfigured threshold. The processor 102 may perform the operations described with reference to FIGS. 11 to 18 based on a program contained in the memory 104.

A chip set including the processor 102 and the memory 104 may be configured. In this case, the chip set may include at least one processor, and at least memory operatively connected to the at least one processor and configured to perform an operation by the at least one processor when being executed. The operation of the processor 102 may include receiving the first VRU message including information on the first VRU through uplink, transmitting the second VRU message obtained by merging a plurality of VRU messages received from a plurality of VRUs for a preconfigured time period through downlink at a preconfigured time point, determining whether to merge the first VRU message to the second VRU message based on a mobility change calculated based on previous mobility information for the first VRU and mobility information acquired from the first VRU message, and independently transmitting the first VRU message through downlink without merging with the second VRU message when the mobility change is equal to or greater than a preconfigured threshold.

A computer-readable storage medium may include at least one computer program for causing the at least one processor to perform an operation of merging the VRU message and transmitting the merged VRU message, and a computer-readable storage medium with the at least one computer program stored therein. The operation of the computer-readable storage medium may include receiving the first VRU message including information on the first VRU through uplink, transmitting the second VRU message obtained by merging a plurality of VRU messages received from a plurality of VRUs for a preconfigured time period through downlink at a preconfigured time point, determining whether to merge the first VRU message to the second VRU message based on a mobility change calculated based on previous mobility information for the first VRU and mobility information acquired from the first VRU message, and independently transmitting the first VRU message through downlink without merging with the second VRU message when the mobility change is equal to or greater than a preconfigured threshold.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 22:
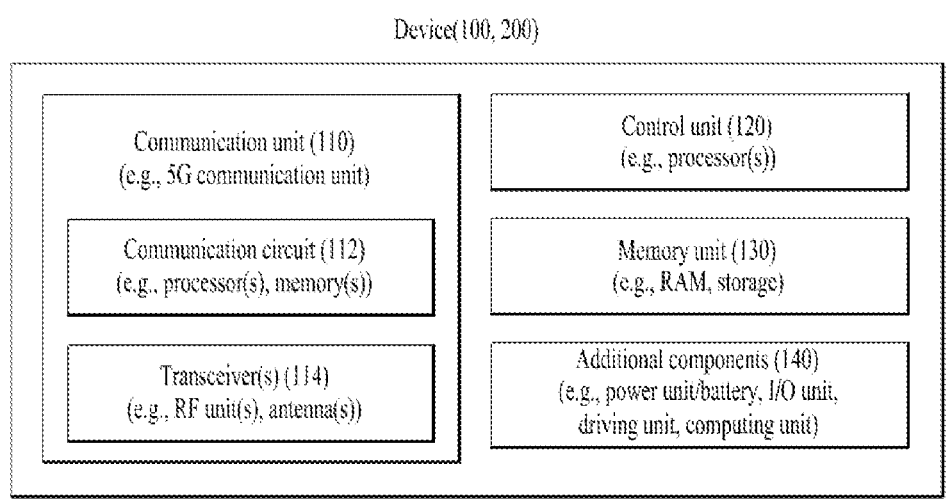
FIG. 22 illustrates another example of a wireless device to which the present disclosure is applied.

FIG. 22 illustrates another example of a wireless device applied to the present disclosure. The wireless device may be implemented in various forms according to a use-case/service (refer to FIG. 20)

Referring to FIG. 22, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 23:
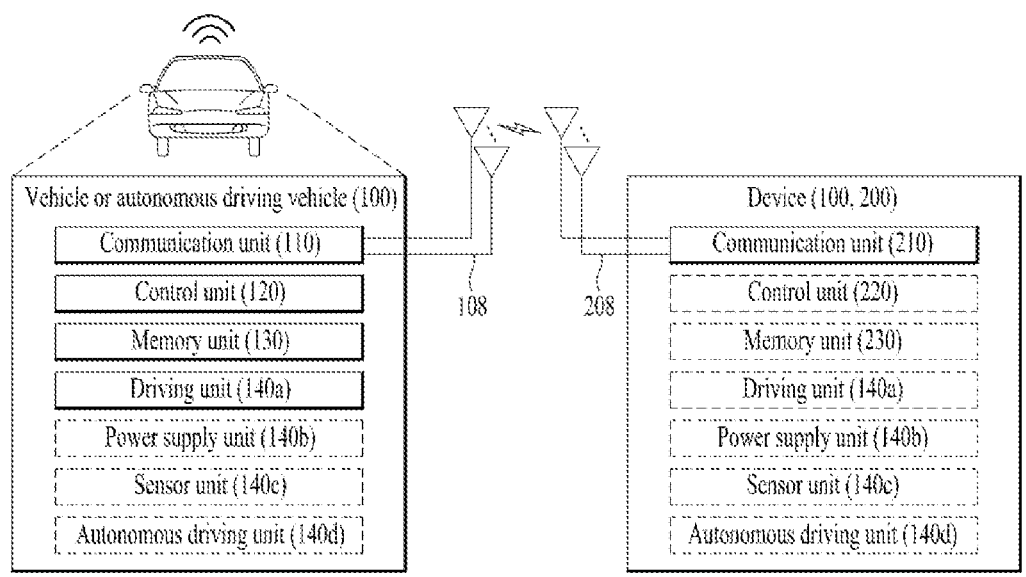
FIG. 23 illustrates a vehicle or an autonomous driving vehicle applied to the present disclosure.

Examples of Vehicles or Autonomous Vehicles to which the Present Disclosure is Applied FIG. 23 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL AVAILABILITY

The above-described embodiments of the present disclosure are applicable to various mobile communication systems.

The invention claimed is:
1. A method by a network comprising:
receiving a first message including first mobility information from a first device;
calculating a first mobility change amount for the first device based on the first mobility information;
determining whether to merge the first message with another message based on the first mobility change amount; and
transmitting, to neighboring devices, a single merge message in which a plurality of messages received from a plurality of devices buffered during a preconfigured time period are merged,
wherein, based on the first mobility change amount being greater than or equal to a preconfigured threshold, the first message is immediately transmitted to the neighboring devices through the network without merging with the single merge message, and wherein, based on the first mobility change amount being less than the preconfigured threshold, the first message is buffered for merging into the single merge message.

2. The method of claim 1, wherein the first mobility change amount includes at least one of a movement speed change, a position change, or a travel angle change.

3. The method of claim 1, wherein, based on (i) the first message including information related to an emergency situation and (ii) the first mobility change amount being equal to or greater than the preconfigured threshold, the network immediately transmits the received first message.

4. The method of claim 1, wherein, based on the first mobility change amount being less than the preconfigured threshold, the single merge message in which the first message is merged is transmitted after the preconfigured time period.

5. The method of claim 1, wherein the first message and the single merged message include a SoftV2X header field, a personal safety message (PSM) container field, and a SoftV2X container field, and
wherein the SoftV2X header field includes common information for transmitting and receiving a vulnerable road user (VRU) message related to a SoftV2X based on a Uu interface, the PSM container field includes information related to a PSM based on a PC5 interface, and the SoftV2X container field includes additional information that is not defined in the PSM.

6. The method of claim 5, wherein the single merge message further includes information about a number of messages merged in the SoftV2X header field, and
wherein each of the PSM container field and the SoftV2X container field includes a plurality of sub-fields corresponding to respective messages.

7. The method of claim 5, wherein the first message and the single merged message are received based on a message configuration of a PSM that further includes the SoftV2X header field in a Regional Extension field, and the SoftV2X header field includes common information for transmitting and receiving a message related to SoftV2X based on a Uu interface.

8. A network comprising:
a radio frequency (RF) transceiver; and
a processor connected to the RF transceiver,
wherein the processor controls the RF transceiver to receive a first message including first mobility information from a first device, calculate a first mobility change amount for the first device based on the first mobility information, determine whether to merge the first message with another message based on the first mobility change amount, transmit, to neighboring devices, a single merge message in which a plurality of messages received from a plurality of devices buffered during a preconfigured time period are merged, and
wherein, based on the first mobility change amount being greater than or equal to a preconfigured threshold, the first message is immediately transmitted to the neighboring devices through the network without merging with the single merge message, and
wherein, based on the first mobility change amount being less than the preconfigured threshold, the first message is buffered for merging into the single merge message.

9. The network of claim 8, wherein the first mobility change amount includes at least one of a movement speed change, a position change, or a travel angle change.

10. The network of claim 8, wherein the single merged message includes a SoftV2X header field, a personal safety message (PSM) container field, and a SoftV2X container field.

11. A chipset, comprising:
at least one processor; and
at least one memory operatively connected to the at least one processor and configured to cause the at least one processor to perform operations when being executed,
wherein the operations include:
receiving a first message including first mobility information from a first device;
calculating a first mobility change amount for the first device based on the first mobility information;
determining whether to merge the first message with another message based on a first mobility change amount;
transmitting, to neighboring devices, a single merge message in which a plurality of messages received from a plurality of devices buffered during a preconfigured time period are merged,
wherein, based on the first mobility change amount being greater than or equal to a preconfigured threshold, the first message is immediately transmitted to the neighboring devices through a network without merging with the single merge message, and
wherein, based on the first mobility change amount being less than the preconfigured threshold, the first message is buffered for merging into the single merge message.

\* \* \* \* \*